(12) United States Patent
Finnie et al.

(10) Patent No.: US 10,526,043 B2
(45) Date of Patent: Jan. 7, 2020

(54) MOTORCYCLE EXHAUST WITH CATALYTIC CONVERTER

(71) Applicant: V&H PERFORMANCE, LLC, Santa Fe Springs, CA (US)

(72) Inventors: Mark E. Finnie, Orange, CA (US); Emmanuel F. Bermudez, Westminster, CA (US)

(73) Assignee: V&H PERFORMANCE, LLC, Santa Fe Springs, CA (US)

( * ) Notice: Subject to any disclaimer, the term of this patent is extended or adjusted under 35 U.S.C. 154(b) by 138 days.

(21) Appl. No.: 15/629,851

(22) Filed: Jun. 22, 2017

(65) Prior Publication Data

US 2017/0369123 A1 Dec. 28, 2017

Related U.S. Application Data

(60) Provisional application No. 62/354,530, filed on Jun. 24, 2016.

(51) Int. Cl.
| | | |
|---|---|---|
| B62M 7/02 | (2006.01) | |
| F01N 3/28 | (2006.01) | |
| F01N 13/08 | (2010.01) | |
| B01J 35/04 | (2006.01) | |
| B01J 23/44 | (2006.01) | |
| B01J 23/46 | (2006.01) | |
| B01D 53/94 | (2006.01) | |

(52) U.S. Cl.
CPC ............... B62M 7/02 (2013.01); B01J 23/44 (2013.01); B01J 23/464 (2013.01); B01J 35/04 (2013.01); F01N 3/28 (2013.01); F01N 13/08 (2013.01); B01D 53/94 (2013.01); B01D 2255/1021 (2013.01); B01D 2255/1023 (2013.01); B01D 2255/1025 (2013.01)

(58) Field of Classification Search
CPC .......... F01N 3/28; F01N 13/08; F01N 13/141; F01N 13/18; F01N 2590/04
See application file for complete search history.

(56) References Cited

U.S. PATENT DOCUMENTS

| | | | | |
|---|---|---|---|---|
| 4,207,661 A | * | 6/1980 | Mase ..................... | B01J 35/04 29/890 |
| 5,118,476 A | * | 6/1992 | Dryer .................... | F01N 3/2857 422/171 |
| 5,315,824 A | * | 5/1994 | Takeshima ............ | F01N 3/0835 422/169 |
| 5,724,735 A | * | 3/1998 | Ickes ..................... | F01N 3/2857 29/890 |
| 5,849,251 A | * | 12/1998 | Timko ................... | B01D 53/9454 422/177 |
| 5,866,079 A | * | 2/1999 | Machida ................ | F01N 3/2853 422/179 |

(Continued)

*Primary Examiner* — Kevin Hurley
*Assistant Examiner* — Michael R Stabley
(74) *Attorney, Agent, or Firm* — Barnes & Thornburg LLP (57) ABSTRACT

A catalytic converter for treatment of exhaust gases from a motorcycle engine includes a housing having an upstream end and a downstream end. A housing body extends between the upstream end and the downstream end. A catalyst mantle is positioned within the body of the housing such that a void is formed between the catalyst mantle and the housing body. A catalyst is positioned within the catalyst mantle. An insulator is positioned within the void between the housing body and the catalyst mantle.

11 Claims, 6 Drawing Sheets

(56) References Cited

U.S. PATENT DOCUMENTS

| | | | | |
|---|---|---|---|---|
| 5,953,817 A * | 9/1999 | Watanabe | ............ | F01N 3/2857 29/890 |
| 5,980,837 A * | 11/1999 | Umin | ............ | F01N 3/2853 422/179 |
| 6,086,829 A * | 7/2000 | Shea | ............ | B01D 53/9454 422/177 |
| 6,155,044 A * | 12/2000 | Kaiho | ............ | F01N 1/08 60/297 |
| 6,185,819 B1 * | 2/2001 | Bauer | ............ | F01N 3/2857 29/890 |
| 6,378,471 B1 * | 4/2002 | Yamada | ............ | F02B 27/02 123/184.53 |
| 6,491,878 B1 * | 12/2002 | Locker | ............ | F01N 3/2853 422/179 |
| 6,559,094 B1 * | 5/2003 | Korotkikh | ............ | B01D 53/864 502/326 |
| 6,568,078 B2 * | 5/2003 | Eisenstock | ............ | B23P 19/04 29/515 |
| 6,623,704 B1 * | 9/2003 | Roth | ............ | B01D 53/885 29/890 |
| 6,772,588 B2 * | 8/2004 | Yamada | ............ | F02B 27/02 60/305 |
| 7,290,388 B2 * | 11/2007 | Kikuchi | ............ | F01N 3/28 60/323 |
| 7,685,714 B2 * | 3/2010 | Tursky | ............ | B01D 53/9454 29/890 |
| 7,895,832 B2 * | 3/2011 | Gruber | ............ | F01N 1/02 181/227 |
| 8,356,639 B2 * | 1/2013 | Merry | ............ | F01N 13/102 138/148 |
| 8,398,926 B2 * | 3/2013 | Suzuki | ............ | B01D 53/945 422/180 |
| 8,522,828 B2 * | 9/2013 | Merry | ............ | F01N 13/141 138/148 |
| 8,590,152 B2 * | 11/2013 | Cantele | ............ | F01N 3/0211 29/890 |
| 8,627,921 B2 * | 1/2014 | Mead | ............ | F01N 1/085 181/251 |
| 8,757,313 B2 * | 6/2014 | Iwata | ............ | B60K 11/04 165/41 |
| 8,783,024 B2 * | 7/2014 | Ono | ............ | F01N 1/02 181/227 |
| 8,851,230 B2 * | 10/2014 | Ono | ............ | F01N 1/089 180/219 |
| 9,016,427 B2 * | 4/2015 | Yazaki | ............ | B62J 23/00 180/309 |
| 9,181,838 B2 * | 11/2015 | Drews | ............ | F01N 3/2803 |
| 2002/0096225 A1 * | 7/2002 | Ishizu | ............ | B21D 22/14 138/114 |

* cited by examiner

FIG. 10

MOTORCYCLE EXHAUST WITH CATALYTIC CONVERTER

CROSS-REFERENCE TO RELATED APPLICATIONS

The present disclosure claims priority to U.S. Provisional Patent Application Ser. No. 62/354,530, filed Jun. 24, 2016, and titled "MOTORCYCLE EXHAUST WITH CATALYTIC CONVERTER," which is herein incorporated by reference in its entirety.

TECHNICAL FIELD

The present disclosure includes devices, systems, and methods for motorcycle exhaust assemblies, and, more particularly, to device, systems, and methods for motorcycle exhaust assemblies including catalytic converters.

BACKGROUND

Motorcycles traditionally include internal combustion engines which combust fuel to generate power to drive the motorcycle. Before being discharged, exhaust gases from the motorcycle's engine can be treated to reduce harmful and/or undesirable effects on the environment. Exhaust gases can reach relatively high temperatures and must be directed safely away from the motorcycle and from occupants of the motorcycle while considering the arrangement of other motorcycle components.

SUMMARY

The present disclosure includes one or more of the features recited in the appended claims and/or the following features which, alone or in any combination, may comprise patentable subject matter:

The present disclosure includes devices, systems, and methods for motorcycle exhausts including catalytic converters for treatment of exhaust gases from the motorcycle.

According to one aspect of the disclosure, a catalytic converter for treatment of exhaust gases from a motorcycle engine includes a housing having an upstream end and a downstream end. A housing body extends between the upstream end and the downstream end. A catalyst mantle is positioned within the body of the housing such that a void is formed between the catalyst mantle and the housing body. A catalyst is positioned within the catalyst mantle. An insulator is positioned within the void between the housing body and the catalyst mantle.

In some embodiments, the housing may have a mouth at the upstream end that is configured to couple to an exhaust header. In some embodiments, the mouth may have a diameter that is less than a diameter of the housing body. In some embodiments, a throat may extend between the mouth and the housing body and may transition from the diameter of the mouth to the diameter of the housing body.

In some embodiments, a housing cap may be coupled to the downstream end of the housing. In some embodiments, the housing cap may have a mouth and an upstream end. The upstream end may be positioned within the void between the housing body and the catalyst mantle. In some embodiments, the mouth may have a diameter that is less than a diameter of the upstream end. In some embodiments, the housing cap may have a throat extending from the mouth and transitioning from the diameter of the mouth to the diameter of the upstream end.

In some embodiments, the catalyst may have a catalyst bed having a number of openings. The openings may receive exhaust gases from the motorcycle engine.

According to another aspect of the disclosure, a motorcycle includes a chassis including a frame extending along an axis defined between a front end and a rear end of the motorcycle. An engine is mounted to the frame and has an exhaust outlet. An exhaust header is provided having an inlet coupled to the exhaust outlet of the engine and extending in a substantially vertical direction. The exhaust header also has an extension extending from the inlet in a substantially horizontal direction parallel to the axis of the frame. The exhaust header also has a mating bend that transitions between the inlet and the extension such that the inlet and the extension of the exhaust header define a bend profile. A catalytic converter is positioned between the inlet and the extension of the exhaust header.

In some embodiments, the catalytic converter may be positioned between the mating bend and the inlet. In some embodiments, the catalytic converter may have a housing having an upstream end and a downstream end. A housing body may extend between the upstream end and the downstream end. The upstream end may have a mouth configured to couple with the exhaust header. The mouth may have a diameter that is less than a diameter of the housing body. A throat may extend between the mouth and the housing body and may transition from the diameter of the mouth to the diameter of the housing body. In some embodiments, a catalyst mantle may be positioned within the housing body such that a void is formed between the catalyst mantle and the housing body. A catalyst may be positioned within the catalyst mantle. An insulator may be positioned within the void between the housing body and the catalyst mantle.

In some embodiments, a housing cap may have a mouth and an upstream end. The upstream end may be coupled to the downstream end of the housing. The mouth may have a diameter that is less than a diameter of the upstream end. A throat may extend from the mouth and may transition from the diameter of the mouth to the diameter of the upstream end. In some embodiments, the upstream end of the housing cap may be positioned within the void between the housing and the catalyst mantle.

According to yet another aspect of the disclosure, a method of assembly for a catalytic converter includes inserting a catalyst into a catalyst mantle. The method also includes applying an insulator around an outside of the catalyst mantle. The method also includes inserting the catalyst mantle with the catalyst into a cavity of a housing body with the insulator applied such that the insulator is positioned within a void between the catalyst mantle and the housing body. The method also includes connecting a housing cap to an end of the housing body.

In some embodiments, connecting the housing cap to an end of the housing body may require inserting an upstream end of the housing cap into the void between the catalyst mantle and the housing body. In some embodiments, connecting the housing cap to an end of the housing body may require connecting the housing cap to a downstream end of the housing body. In some embodiments, connecting the housing cap to an end of the housing body may require connecting a housing cap having a mouth having a diameter that is less than a diameter of the housing body. In some embodiments, connecting the housing cap to an end of the housing body may require connecting an upstream end of the housing cap to the end of the housing body, the upstream end of the housing cap having a diameter that is greater than the diameter of the mouth. In some embodiments, connecting the housing cap to an end of the housing body may require connecting a housing cap having a throat that extends between the mouth and the upstream end and transitions from the diameter of the mouth to the diameter of the upstream end.

BRIEF DESCRIPTION OF THE DRAWINGS

The detailed description particularly refers to the following figures, in which.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention.

Motorcycles exhaust assemblies direct exhaust products, (mostly exhaust gases), away from the motorcycle and occupants. Exhaust gases can have temperatures exceeding 500° F. Such temperature can present a burn hazard to motorcycle components and occupants which may come in close proximity to and/or contact with exhaust components such as piping. Properly routing exhaust piping can reduce exposure to such hazards.

Catalytic converters can treat exhaust gases by encouraging conversion of certain constituents into forms that are less harmful to the environment. However, such catalytic converters perform their treatment function partly by maintaining very high temperatures, for example, exceeding 700° F. Formerly, at least for after-market motorcycle exhaust assemblies, applicable law and regulations may not have required catalytic converters and/or may not have effectively enforced requirements for catalytic converters. Efforts to reduce pollutants may insist and/or more effectively enforce existing requirements for catalytic converters on motorcycle exhaust assemblies.

Incorporation of catalytic converters within motorcycle exhaust assemblies, presents a potential burn hazard as well as an encumbrance along the exhaust flow path. The present disclosure includes devices, systems, and methods for implementation of catalytic converters of motorcycle exhaust assemblies to reduce harmful pollutant effects while safely and effectively directing exhaust gases away from the motorcycle and its occupants.

Figure 1:
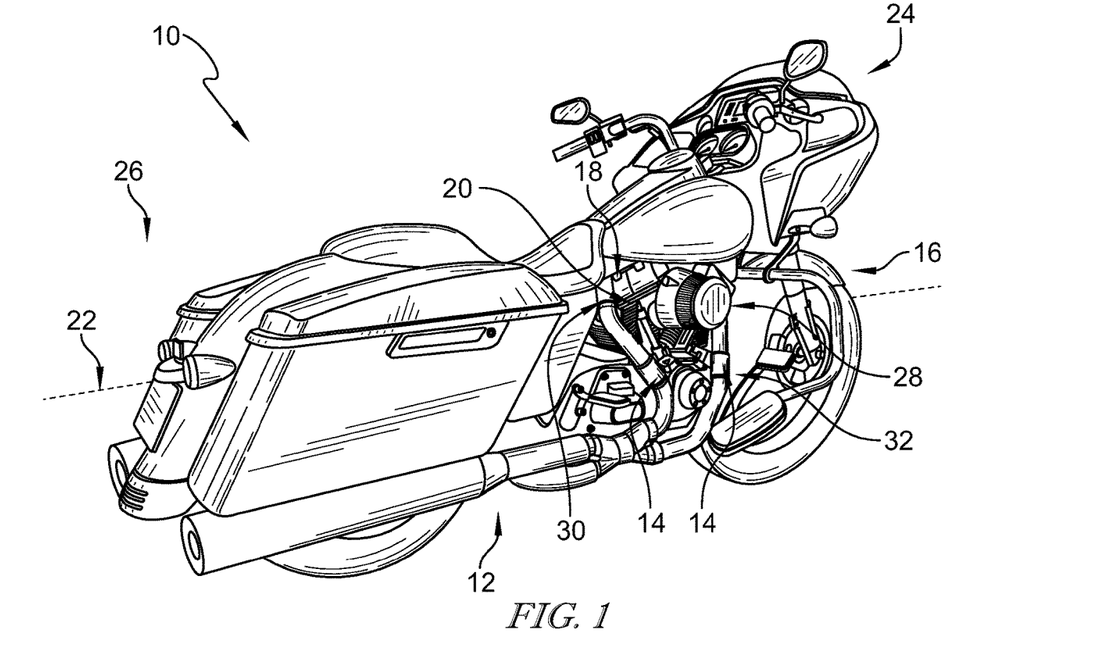
FIG. 1 is a perspective view of a motorcycle including an motorcycle exhaust assembly including an exhaust header that includes a pair of exhaust conduits that connect to an engine to receive exhaust gases and include catalytic converters arranged along the exhaust conduits for receiving and treating exhaust gases before discharge to the environment, and showing that the exhaust header includes curvature defining bend profiles including an upstream portion extending from the engine in a substantially vertical direction towards the ground and a downstream portion extending in a substantially horizontal position towards a rear end of the motorcycle and including a mating bend disposed between the upstream and downstream portions of the bend profile.

Referring now to FIG. 1, there is shown a motorcycle 10 including an exhaust assembly 12 including catalytic converters 14 for treatment of exhaust gases (which may include some portions of gases, liquids, and/or solids as products of combustion) of the motorcycle 10. The motorcycle 10 illustratively includes a chassis 16 including a frame 18 and an engine 20 that is adapted to provide power to drive the motorcycle 10. The frame 18 illustratively extends along an axis 22 between a front end 24 and a rear end 26 of the motorcycle 10. The engine 20 is illustratively coupled to the frame 18 near the front end 24 of the motorcycle 10.

The engine 20 is illustratively embodied as an internal combustion engine including a front exhaust port 28 and a rear exhaust port 30 for discharging exhaust gases from the engine 20 after combustion as shown in FIG. 1. The exhaust assembly 12 illustratively connects with the exhaust ports 28, 30 to receive exhaust gases from the engine 20. The exhaust assembly 12 illustratively directs exhaust gases of the engine 20 to (optional) mufflers positioned near the rear end 26 of the motorcycle 10 for expelling to the environment.

Figure 2:
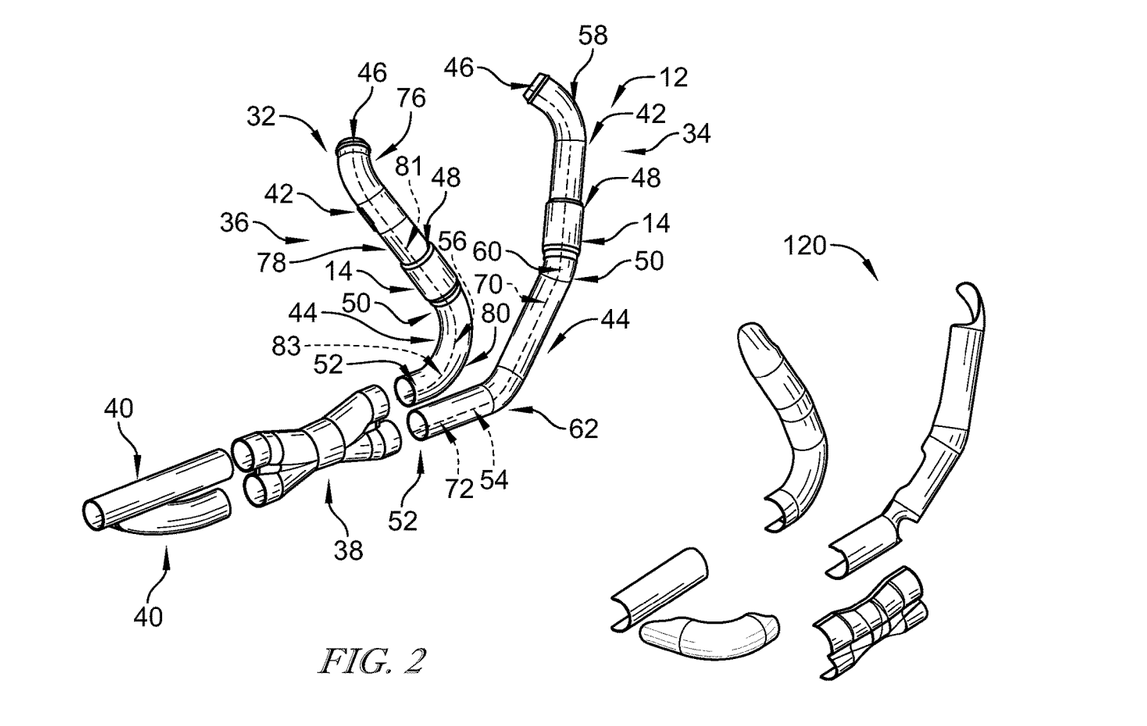
FIG. 2 is an exploded perspective view of the motorcycle exhaust assembly of the motorcycle of FIG. 1 showing each exhaust conduit of the exhaust header includes an inlet section for connection to the engine and an extension section arranged to receive exhaust gases from the inlet section, and showing that the catalytic converters are connected between the inlet sections and the extension sections to receive exhaust gases from the inlet section, to pass exhaust gases through the catalytic converter for treatment, and to direct treated exhaust gases to the extension section for guidance to the rear end of the motorcycle.

As best shown in FIG. 2, the exhaust assembly 12 illustratively includes the catalytic converters 14 and an exhaust header 32 for directing exhaust gases through the catalytic converter 14 and towards the rear end 26 of the motorcycle 10. In the illustrative embodiment, the exhaust header 32 includes a front exhaust conduit 34 and a rear exhaust conduit 36 which connect to the front and rear exhaust ports 28, 30, respectively, a merge collector 38 connected with the exhaust conduits 34, 36 to combine exhaust gases from each exhaust conduit 34, 36, and a pair of tail conduits 40 connected to the merge collector 38 to receive a portion of the combined exhaust gases therefrom.

As shown in FIG. 2, each exhaust conduit 34, 36 illustratively includes an inlet section 42 and an extension section 44. Each extension section 44 is arranged downstream of its respective inlet section 42 to receive exhaust gases therefrom. One of the catalytic converters 14 is illustratively positioned between each inlet section 42 and its respective extension section 44 to receive exhaust gases for treatment.

In the illustrative embodiment as shown in FIG. 2, each inlet section 42 includes an inlet end 46 that connects with a respective exhaust port 28, 30 of the engine 20 and an outlet end 48 opposite the inlet end 46 for connection with one of the catalytic converters 14. Each inlet section 42 illustratively extends between its respective inlet and outlet ends 46, 48 and includes curvature defined to pass exhaust gases from the inlet end 46 to the outlet end 48.

Each extension section 44 illustratively includes an inlet end 50 connected with a respective catalytic converter 14 to receive exhaust gases therefrom and an outlet end 52 that connects with the merge collector 38 as shown in FIG. 2. Each extension section 44 illustratively extends between its respective inlet and outlet ends 50, 52 and includes curvature defined to pass exhaust gases from the inlet end 50 to the outlet end 52.

In the illustrative embodiment as shown in FIG. 2, the collective curvature of the inlet and extension sections 42, 44 of the front exhaust conduit 34 define a bend profile 54 and the collective curvature of the inlet and extension sections 42, 44 of the rear exhaust conduit 36 define a bend profile 56. The respective bend profiles 54, 56 provide flow path contours for exhaust gases to pass from the exhaust ports 28, 30 through the catalytic converters 14 and towards the rear end 26 of the motorcycle 10.

Figure 3:
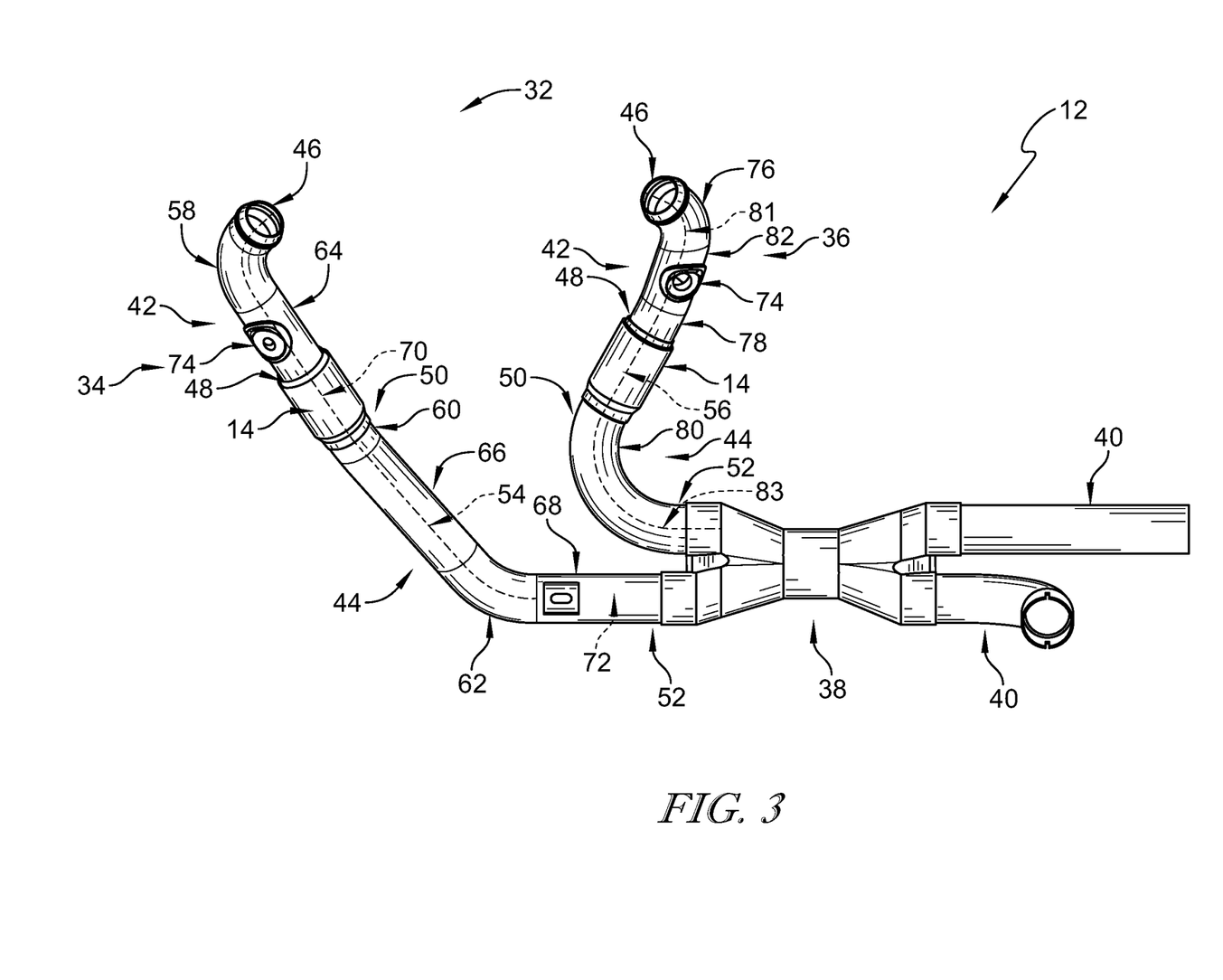
FIG. 3 is an elevation view of motorcycle exhaust assembly of FIG. 2 viewed from the (occupant) right side of the motorcycle to which the motorcycle exhaust assembly attaches.

In the illustrative embodiment as shown in FIG. 3, each bend profile 54, 56 illustratively includes bends defined between the inlet end 46 of the inlet section 42 and the outlet end 52 of the extension section 44. The bend profile 54 of the front exhaust conduit 34 illustratively includes a first bend 58 defined near the inlet end 46, a second bend 60 arranged downstream from the first bend 58, and a third bend 62 arranged downstream from the second bend 60.

In the illustrative embodiment as shown in FIG. 3, the curvature of the bends 58, 60, 62 of the profile 54 of the front exhaust conduit 34 are hereafter described in terms of degrees of bend and degrees of rotation, wherein the degrees of rotation are stated based on the curvature of the bend of the profile 54 that is immediately upstream of the present bend so that, for example, the degrees of rotation of the second bend 60 are stated based on the curvature of the first bend 58 (which has no bend upstream and therefore illustratively itself has a degree of rotation of 0), and degrees of rotation of the third bend 62 are stated based on the curvature of the second bend 60. The first bend 58 is illustratively embodied to include about 63 degrees of bend and about 0 degrees of rotation, but in some embodiments may include about 50 to about 75 degrees of bend and about −20 to about 20 degrees of rotation (in embodiments where a bend is arranged upstream therefrom). The second bend 60 illustratively includes about 22 degrees of bend and about 29 degrees of rotation (perhaps best shown in FIG. 2), but in some embodiments may include about 0 to about 50 degrees of bend and about 10 to about 50 degrees of rotation. The third bend 62 illustratively includes about 49 degrees of bend and about −65 degrees of rotation, but in some embodiments may include about 30 to about 80 degrees of bend and about −80 to about −40 degrees of rotation.

As shown in FIG. 3, the bend profile 54 illustratively includes straight portions 64, 66, 68 that connect with the bends 58, 60, 62. In the illustrative embodiment, the straight portion 64 is defined downstream from the first bend 58 and upstream of the second bend 60 and includes an oxygen sensor bung 74. The inlet section 42 of the front exhaust conduit 34 illustratively defines the first bend 58 and the straight portion 64. The catalytic converter 14 illustratively connects with the inlet section 42 downstream of the straight portion 64.

As shown in FIG. 3, the extension section 44 illustratively defines the second bend 60, the straight section 66, and the third bend 62. The straight section 66 is illustratively defined downstream of the second bend 60 and upstream of the third bend 62. The catalytic converter 14 illustratively connects with the inlet end 50 of the extension section 44 near the second bend 60. In some embodiments, the catalytic converter 14 may be disposed within the straight section 66 of the front exhaust conduit 34.

As shown in FIG. 3, the third bend 62 illustratively connects on an upstream side with the straight section 66 and on a downstream side to the straight section 68. The third bend 62 forms a mating bend that transitions the general direction of the bend profile 54 along the exhaust gas flow path from a substantially vertical direction to a substantially horizontal direction according to the orientation as shown in FIGS. 1-3.

In the illustrative embodiment as shown in FIG. 3, the bend profile 54 illustratively includes a portion 70 between the inlet end 46 and the third bend 62 that extends in a substantially vertical direction (according to the orientation as shown in FIGS. 1-3). Although not exclusively limited to the vertical direction, the substantially vertical orientation of the portion 70 of the bend profile 54 that is upstream from the third bend 62 (mating bend) directs exhaust gases towards the ground away from the engine 20 and away from occupants of the motorcycle 10 while considering component arrangement and occupant body position.

As shown in FIG. 3, the bend profile 54 illustratively includes a portion 72 downstream from the third bend 62 (mating bend) that extends in a substantially horizontal direction (according to the orientation as shown in FIGS. 1-3). Although not exclusively limited to the horizontal direction, orientation of the portion 72 of the bend profile 54 that is downstream of the third bend 62 in a substantially horizontal direction directs exhaust gases away from the occupant of the motorcycle 10 towards the rear end 26 of the motorcycle 10 for expelling to the environment while considering component arrangement and occupant body position.

The third bend 62 thus defines the mating bend to transition between the portion 70 of bend profile 54 extending in a substantially vertical direction and the portion 72 of the bend profile 54 extending in a substantially horizontal direction. In the illustrative embodiment, the portion of the bend profile 54 extending in a substantially horizontal direction is substantially parallel to the axis 22 (as shown in FIG. 1).

In the illustrative embodiment as shown in FIG. 3, the bend profile 56 of the rear exhaust conduit 36 illustratively includes a first bend 76 defined near the inlet end 46, a second bend 78 arranged downstream from the first bend 76, and a third bend 80 arranged downstream from the second bend 78.

In the illustrative embodiment as shown in FIG. 3, the curvature of the bends 76, 78, 80 are hereafter described in terms of degrees of bend and degrees of rotation, wherein the degrees of rotation are stated based on the curvature of the bend of the profile 56 that is immediately upstream of the present bend so that, for example, the degrees of rotation of the second bend 78 are stated based on the curvature of the first bend 76 (which has no bend upstream and therefore illustratively itself has a degree of rotation of 0), and degrees of rotation of third bend 80 are stated based on the curvature of the second bend 78. The first bend 76 is illustratively embodied to include about 46 degrees of bend and about 0 degrees of rotation, but in some embodiments may include about 35 to about 65 degrees of bend (in embodiments where a bend is arranged upstream therefrom). The second bend 78 illustratively includes about 33 degrees of bend and about −39 degrees of rotation, but in some embodiments may include about 0 to about 50 degrees of bend and about −60 to about −20 degrees of rotation. The third bend 80 illustratively includes about 119 degrees of bend and about −113 degrees of rotation, but in some embodiments may include about 100 to about 150 degrees of bend and about −130 to about −90 degrees of rotation.

As shown in FIG. 3, the bend profile 56 illustratively includes a straight portion 82 that connects with the bends 76, 78. In the illustrative embodiment, the straight portion 82 is defined downstream from the first bend 76 and upstream of the second bend 78 and includes an oxygen sensor bung 74. The inlet section 42 of the rear exhaust conduit 36 illustratively defines the first bend 76, the straight portion 82, and the second bend 78. The catalytic converter 14 connects with the outlet end 48 of the inlet section 42 near the second bend 78.

As shown in FIG. 3, the extension section 44 of the rear exhaust conduit 36 illustratively defines the third bend 80. The catalytic converter 14 illustratively connects to the inlet end 50 of the extension section 44 near the third bend 80. The extension section 44 illustratively connects to the merge collector 38 at the outlet end 52 downstream of the third bend 80. The third bend 80 forms a mating bend that provides transition in the general direction of the bend profile 56 along the exhaust gas flow path from a substantially vertical direction to a substantially horizontal direction according to the orientation as shown in FIGS. 1-3.

In the illustrative embodiment as shown in FIG. 3, the bend profile 56 illustratively includes a portion 81 between the inlet end 46 and the third bend 80 that extends in a substantially vertical direction (according to the orientation as shown in FIGS. 1-3). Although not exclusively limited to the vertical direction, the substantially vertical orientation of the portion 81 of the bend profile 56 that is upstream from the third bend 80 (mating bend) directs exhaust gases towards the ground away from the engine 20 and away from occupants of the motorcycle 10.

In the illustrative embodiment as shown in FIG. 3, the bend profile 56 illustratively includes a portion 83 that is downstream from the third bend 80 that extends in a substantially horizontal direction (according to the orientation as shown in FIGS. 1-3). Although not exclusively limited to the horizontal direction, orientation of the portion 83 of the bend profile 56 that is downstream of the third bend 80 in a substantially horizontal direction directs exhaust gases away from the occupant of the motorcycle 10 towards the rear end 26 of the motorcycle 10 for expelling to the environment while considering component arrangement and occupant body position. The third bend 80 thus defines the mating bend between the portion 81 of bend profile 56 extending in a substantially vertical direction and the portion 83 of the bend profile 56 extending in a substantially horizontal direction. In the illustrative embodiment, the portion 83 of the bend profile 56 extending in a substantially horizontal direction is substantially parallel to the axis 22 (as shown in FIG. 1).

The particular bend profiles 54, 56 of the exhaust header 32 permit the catalytic converters 14 to be arranged along the portions 70, 81 of the bend profiles 54, 56 that extend in substantially vertical directions. The disclosed motorcycle exhaust assemblies, and particularly, the disclosed arrangements of the catalytic converters 14, can remove bulk from the downstream areas of the motorcycle exhaust assembly and reduce heat loss from the exhaust gases as they pass from the engine 20 to the catalytic converters 14 by their close proximity to the engine 20 to increase catalyst performance.

Figure 4:
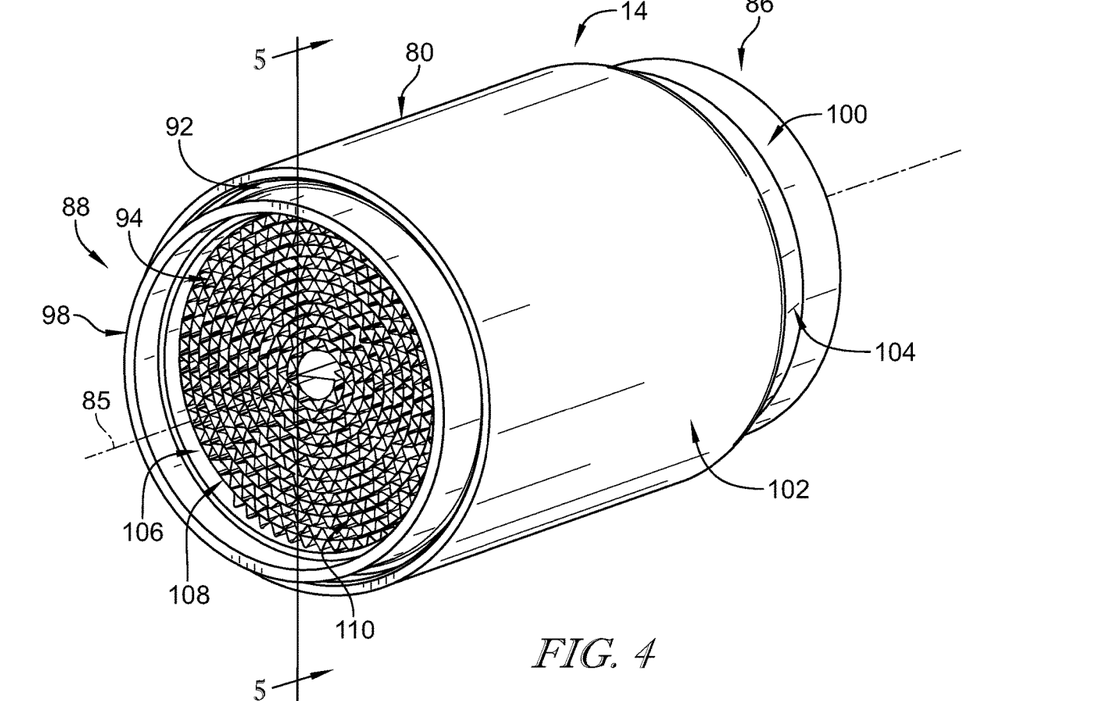
FIG. 4 is a perspective view of the catalytic converters of the motorcycle exhaust assembly of FIGS. 2 and 3 showing that the catalytic converters include a housing, a catalyst positioned inside the housing and having a honeycomb structure, and an end cap connected to the housing on an outlet end.
Figure 5:
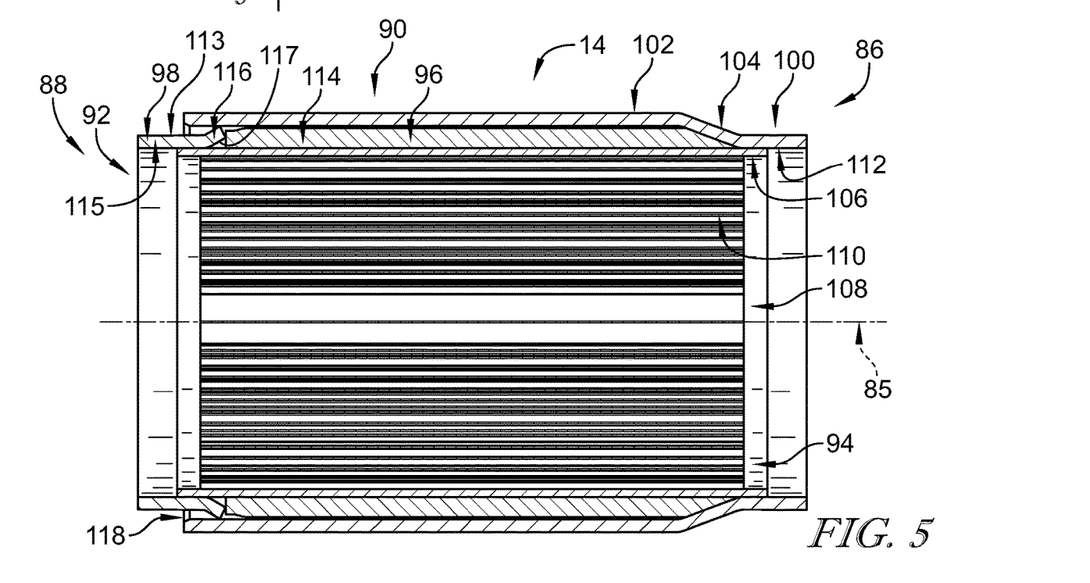
FIG. 5 is a cross-sectional view of the catalytic converters of FIG. 4 taken along the line 5-5 showing that the catalytic converters include an insulator positioned between the catalyst and a shell of the housing to reduce heat loss from the catalyst.
Figure 6:
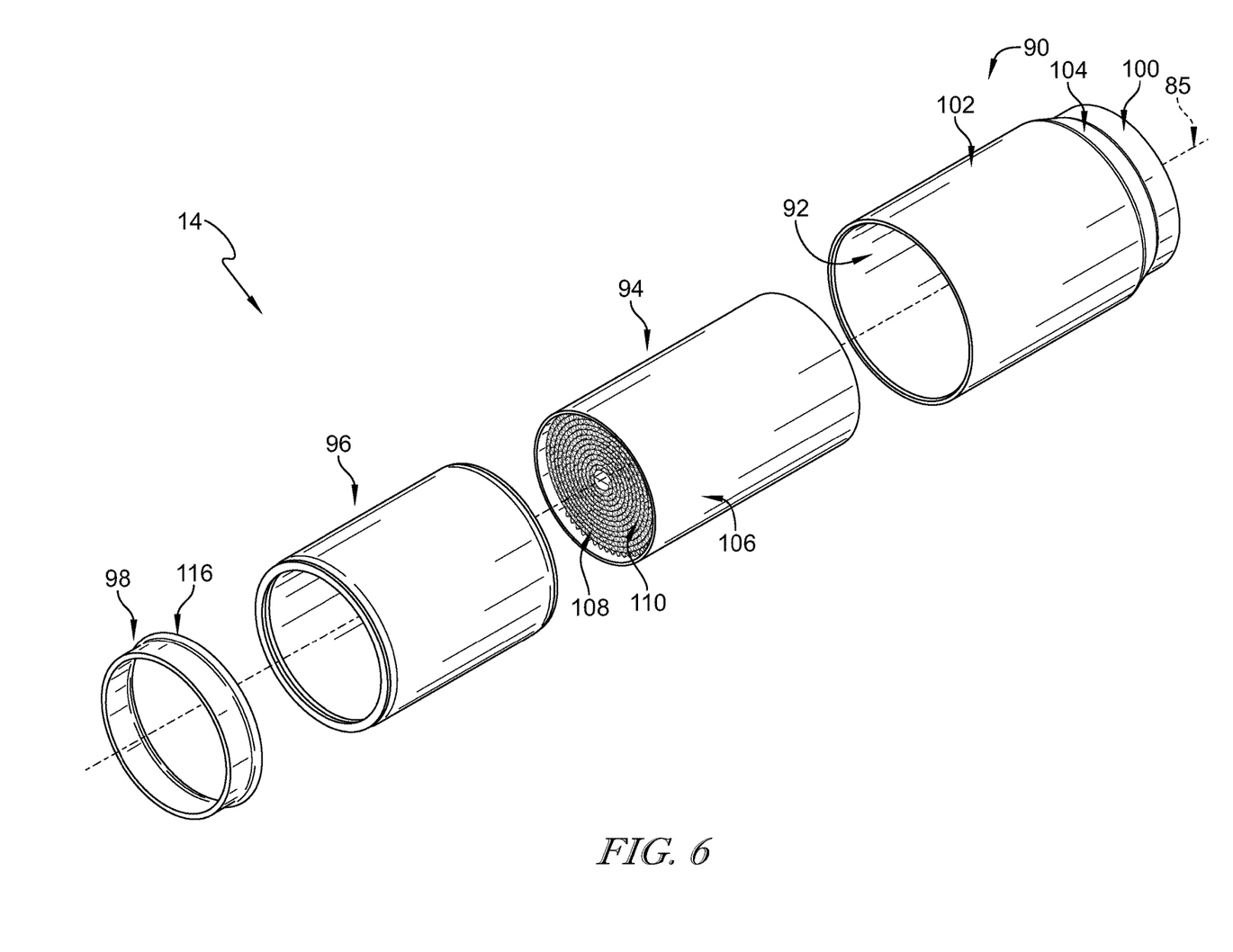
FIG. 6 is an exploded perspective view of the catalytic converters of FIGS. 4 and 5 showing that the catalyst includes a mantle and a catalyst bed positioned within the mantle and that the housing includes a mouth having a first diameter, a body having a second diameter that is greater than the first diameter, and a throat that extends between the mouth and the body to transition between the first and second diameters.

Referring now to FIGS. 4-10, an illustrative embodiment of the catalytic converters 14 is shown. As shown in FIGS. 4 and 6, each catalytic converter 14 illustratively extends along an axis 85 between an inlet end 88 for connection to the outlet end 48 of the respective inlet section 42 of the exhaust header 32 and an outlet end 86 for connection to the inlet end 50 of the respective extension section 44 of the exhaust header 32. Each catalytic converter 14 illustratively includes a housing 90 embodied as a cylindrical shell that defines a cavity 92 therein, a catalyst 94 disposed within the cavity 92, an insulator 96 disposed within the cavity 92 between the catalyst and the housing 90, and an end cap 98 attached to the housing 90 near the inlet end 88 of the catalytic converter 14. The catalytic converters 14 receive exhaust gases from the engine 20 that pass through the housing 90 and across the catalyst 94 for treatment to reduce harmful environmental effects.

As shown in FIG. 4, the housing 90 illustratively includes a mouth 100 arranged near the outlet end 86 and extending along the axis 85 for a length to define an outer diameter, a body 102 extending along the axis 85 for a length and defining an outer diameter larger than the outer diameter of the mouth 100, and a throat 104 extending along the axis between the mouth 100 and the body 102 as a transition between their outer diameters. In the illustrative embodiment, the throat 104 forms a smooth tapered connection between the mouth 100 and the body 102. The mouth 100, body 102, and throat 104 are each illustratively formed of sheet metal and collectively form a cylindrical shape to define the cavity 92. In some embodiments, the housing 90 may have any suitable shape for passing exhaust gases for treatment with the catalyst 94.

As shown in FIG. 4, the catalyst 94 is illustratively arranged in the cavity 92 of the housing 90. The catalyst 94 illustratively includes a mantle 106 that defines a void 108 therein and a catalyst bed 110 disposed within the void 108. The mantle 106 is illustratively embodied as sheet metal formed into a cylinder to define the void 108 for housing the catalyst bed 110. When assembled along the exhaust header 32, the mantle 106 of each catalytic converter 14 form a portion of the continuous flow path of the respective exhaust conduits 34, 36 for directing the exhaust gases to interact with the catalyst bed 110.

The catalyst bed 110 is illustratively embodied to include precious metals disposed on a substrate in a honeycomb structure as show in FIG. 4. In the illustrative embodiment, the substrate includes a metallic monolith, but in some embodiments the substrate may include ceramic monoliths and/or any other suitable substrate materials and/or arrangements. In the illustrative embodiment, the precious metals include platinum, but in some embodiments may include palladium, rhodium, and/or any other suitable catalyst materials. Exhaust gases illustratively pass through the void 108 and undergo reactions that can be catalyzed by the presence of the catalyst bed 110 to convert at least some constituents of the exhaust gases into less harmful forms for expelling into the environment.

As shown in FIG. 5, the catalyst 94 is disposed within the cavity 92 of the housing 90 and extending along the axis 85 at least partly across each of the mouth 100, the body 102, and the throat 104 of the housing 90. The mantle 106 is illustratively welded to the mouth 100 near the outlet end 86 on an interior side 112 thereof. As shown in FIG. 5, a space 114 is defined radially between the mantle 106 and the housing 90 (along the body 102 and the throat 104) for receiving the insulator 96 therein.

As shown in FIG. 5, the insulator 96 illustratively surrounds the catalyst 94 to maintain high temperature within the catalyst 94 by reducing heat loss from the exhaust gases and to reduce the temperature of the housing 90. The incorporation of the insulator 96 within housing 90 reduces the potential hot hazard along the portions 70, 81 arranged in the substantially vertical direction (which can be particularly near to the occupant's leg in the arrangement discussed above regarding FIGS. 1-3). In the illustrative embodiment, the insulator 96 is formed of a mat of thermal insulating material such as Interam® 900HT, 1020 g/m² as marketed by 3M™. In some embodiments, the insulator 96 may include any suitable thermal insulation material. The insulator 96 is illustratively applied to the outside of the mantle 106 to reduce heat transfer through the mantle 106. The insulator 96 is illustratively maintained in position by being pressed between the throat 104 and the end cap 98.

As shown in FIG. 5, the end cap 98 is illustratively attached to the housing 90 near the inlet end 88 of the catalytic converter 14. The end cap 98 is illustratively embodied as sheet metal formed into a cylinder and includes a stem 113 having an inner diameter 115 and a flare 116 that projects radially outward to define an inner diameter 117 greater than the inner diameter 115. The end cap 98 is illustratively connected with the housing 90 such that the flare 116 is inserted into the space 114 near the inlet end 88 and the inner diameter 115 contacts the mantle 106 of the catalyst 94. In the illustrative embodiment, the end cap 98 is secured to the housing 90 by a seam weld 118 disposed therebetween. The end cap 98 is illustratively configured to receive the outlet end 48 of the inlet section 42 of the respective exhaust conduit 34, 36 of the exhaust header 32 to direct exhaust gases from the catalytic converter 14 to the extension section 44.

Figure 7:
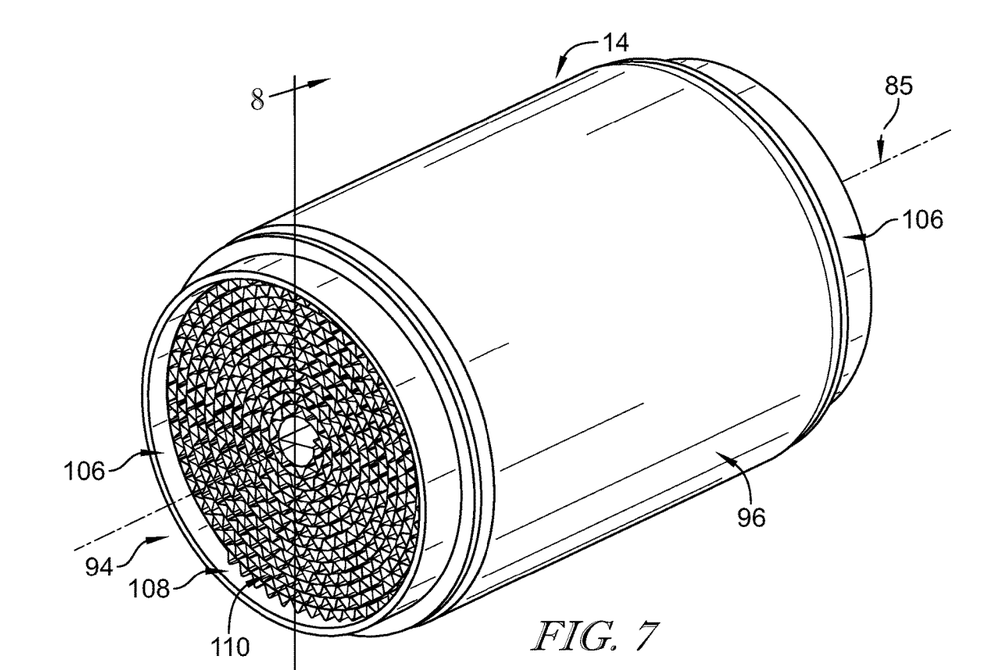
FIG. 7 is a perspective view of the catalytic converters of FIGS. 4-6 without the housing and end cap to show that the insulator is applied about an outside of the catalyst.
Figure 8:
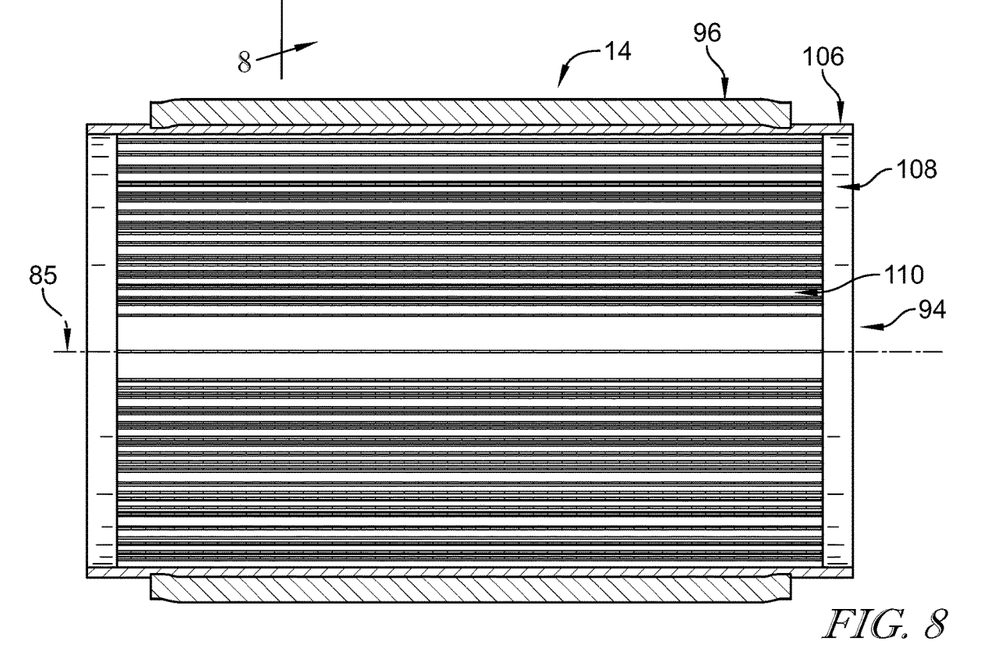
FIG. 8 is a cross-sectional view of the catalytic converters of FIGS. 4-7 taken along the line 8-8 showing that the insulator is applied about the mantle of the catalyst.

Referring to FIGS. 4, 5, and 7-10, a method of assembling the catalytic converters 14 is shown. In the illustrative embodiment as shown in FIGS. 7 and 8, the insulator 96 is applied about the mantle 106 to surround the catalyst 94. The insulator 96 is illustratively applied to the outside of the mantle 106 in position for insertion within the housing 90.

Figure 9:
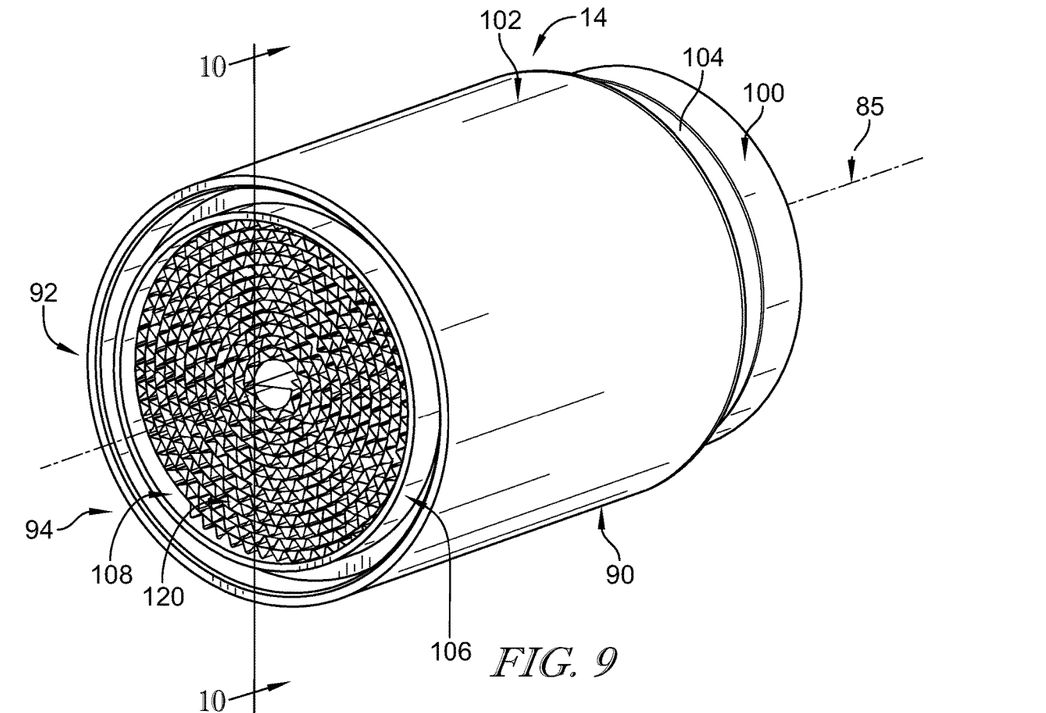
FIG. 9 is a perspective view of the catalytic converters of FIGS. 4-8 showing that the catalyst with the insulator applied is inserted within the housing and showing that the end cap has not yet been secured to an outlet end of the housing.
Figure 10:
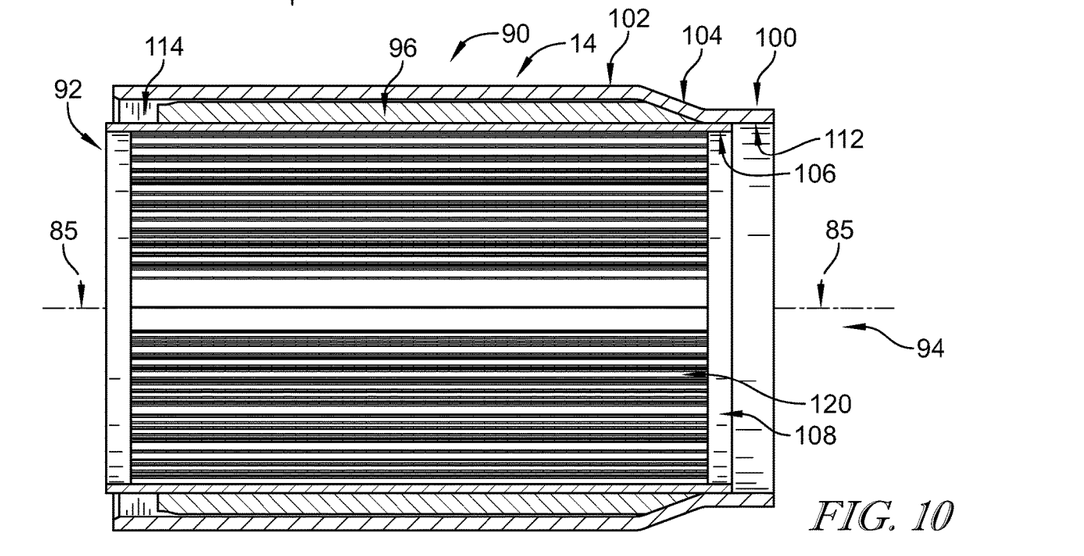
FIG. 10 is a cross-sectional view of the catalytic converters of FIGS. 4-9 taken along the line 10-10 showing that the insulator is received within a space defined between the mantle and the housing.

As shown in FIGS. 9 and 10, the catalyst 94, with the insulator 96 applied, is inserted into the cavity 92 of the housing 90. The insertion creates the space 114 between the mantle 106 and the housing 90 and the insulator 96 is arranged therein. In the illustrative embodiment, the mantle 106 is welded to the mouth 100.

Returning to FIGS. 4 and 5, the end cap 98 is illustratively attached to the housing 90 near the inlet end 88. The flare 116 is inserted within the space 114 and illustratively abuts the insulator 96. The end cap 98 is illustratively welded to the housing 90 to secure the same together.

In the illustrative embodiment, the end cap 98 is configured for connection with the outlet end 48 of the inlet section 42, and the mouth 100 is configured for connection with the inlet end 50 of the extension section 44. In some embodiments, the inlet end 88 and outlet end 86 of the catalytic converter 14 may be transposed such that the end cap 98 is configured to connect with the inlet end 50 of the extension section 44, and the mouth 100 is configured to connect with the outlet end 48 of the inlet section 42. The illustrative embodiments may include heat shields 120, as shown in FIG. 2, for attachment over the outside of various portions of the exhaust assembly 12 for additional protection of the occupants' bodies from the heat of the exhaust gases.

The present disclosure includes devices, systems, and methods for implementation of motorcycle exhaust assemblies including catalytic converters. In the illustrative embodiments, the insulator 96 being disposed within the housing 90 of the catalytic converters 14 provides a compact design that is thermally insulated to improve catalytic effect and to reduce temperatures to which occupants' bodies are exposed.

The present disclosure includes an engine 20 adapted to provide power to drive the chassis 16 of the motorcycle 10. In the illustrative embodiment, the chassis 16 includes a traditional drive train including manual transmission, chain drive assembly, and auxiliaries configured to turn the rear wheel. In some embodiments, the drive train may include any suitable mechanism for converting power from the engine 20 into drive force for the motorcycle 10, such as, for example, hybrid-electric drive trains incorporating electric storage and motor, various other traditional drivetrain arrangements such as automatic and/or continuously variable transmissions, shaft driven assemblies, and/or combinations thereof.

In the illustrative embodiment, the motorcycle 10 is shown to include a single front and single rear wheel, but in some embodiments may include any number of front and rear wheels. In the illustrative embodiment, the engine 20 includes a pair of exhaust ports 28, 30 and the exhaust header 32 includes a pair of exhaust conduits 34, 36 connected thereto. In some embodiments, the exhaust header 32 may include any suitable number of exhaust ports and exhaust conduits. In the illustrative embodiment, each bend 58, 60, 62, 76, 78, 80 of the respective profiles 54, 56 of the front and rear exhaust conduits 34, 36 illustratively includes a bend radius of 3 inches, but in some embodiments may include any suitable bend radius and/or various bend radii between them.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the apparatus, system, and method described herein. It will be noted that alternative embodiments of the apparatus, system, and method of the present disclosure may not include all of the features described yet still benefit from at least some of the advantages of such features. Those of ordinary skill in the art may readily devise their own implementations of the apparatus, system, and method that incorporate one or more of the features of the present invention and fall within the spirit and scope of the present disclosure.

What is claimed is:

1. A catalytic converter for treatment of exhaust gases from a motorcycle engine, the catalytic converter comprising:
    a housing having an upstream end and a downstream end,
        a housing body extending between the upstream end and the downstream end,
        a catalyst mantle positioned within the housing body such that a void is formed between the catalyst mantle and the housing body,
        a catalyst positioned within the catalyst mantle,
        an insulator positioned within the void between the housing body and the catalyst mantle, and
        a housing cap coupled to the downstream end of the housing, the housing cap having a mouth and an upstream end, the upstream end secured within the void between the housing body and the catalyst mantle.

2. The catalytic converter of claim 1, wherein the housing includes a mouth at the upstream end that is configured to couple to an exhaust header.

3. The catalytic converter of claim 2, wherein the mouth of the housing has a diameter that is less than a diameter of the housing body.

4. The catalytic converter of claim 3 further comprising a throat extending between the mouth of the housing and the housing body and transitioning from the diameter of the mouth of the housing to the diameter of the housing body.

5. The catalytic converter of claim 1, wherein the mouth of the housing cap has a diameter that is less than a diameter of the upstream end.

6. The catalytic converter of claim 5, wherein the housing cap includes a throat extending from the mouth of the housing cap and transitioning from the diameter of the mouth of the housing cap to the diameter of the upstream end.

7. The catalytic converter of claim 1, wherein the catalyst comprises a catalyst bed having a number of openings, the openings receiving exhaust gases from the motorcycle engine.

8. The catalytic converter of claim 1, wherein the upstream end of the housing is configured to couple to an inlet of an exhaust header that extends in a substantially vertical direction between an exhaust outlet of an engine and the upstream end of the housing.

9. The catalytic converter of claim 1, wherein the downstream end of the housing is configured to couple to an extension of an exhaust header that extends in a substantially horizontal direction from the downstream end of the housing.

10. A motorcycle comprising:
    a chassis including a frame extending along an axis defined between a front end and a rear end of the motorcycle,
    an engine mounted to the frame and having an exhaust outlet,
    an exhaust header including:
        an inlet coupled to the exhaust outlet of the engine and extending in a substantially vertical direction, and
        an extension extending from the inlet in a substantially horizontal direction parallel to the axis of the frame, and
        a mating bend that transitions between the inlet and the extension such that the inlet and the extension of the exhaust header define a bend profile,
    a catalytic converter positioned between the inlet and the extension of the exhaust header, wherein the catalytic converter comprises:
        a housing having an upstream end and a downstream end, a housing body extending between the upstream end and the downstream end, the upstream end having a mouth configured to couple with the exhaust header, the mouth having a diameter that is less than a diameter of the housing body, the housing further including a throat extending between the mouth and the housing body and transitioning from the diameter of the mouth to the diameter of the housing body,
        a catalyst mantle positioned within the housing body such that a void is formed between the catalyst mantle and the housing body,
        a catalyst positioned within the catalyst mantle, and
        an insulator positioned within the void between the housing body and the catalyst mantle, and
    a housing cap having a mouth and an upstream end, the upstream end coupled to the downstream end of the housing, the mouth having a diameter that is less than a diameter of the upstream end, wherein a throat extends from the mouth and transitions from the diameter of the mouth to the diameter of the upstream end, wherein the upstream end of the housing cap is positioned within the void between the housing and the catalyst mantle.

11. The motorcycle of claim 10, wherein the catalytic converter is positioned between the mating bend and the inlet.

* * * * *